United States Patent
Leiss et al.

(10) Patent No.: US 10,000,328 B1
(45) Date of Patent: Jun. 19, 2018

(54) VEHICLE FUEL TANK FOR IMPROVED CRASHWORTHINESS

(71) Applicant: ROBSON FORENSIC, INC., Lancaster, PA (US)

(72) Inventors: Peter J. Leiss, Middletown, PA (US); Marcus A. Mazza, Lebanon, PA (US); Bret W. Johnson, Lancaster, PA (US)

(*) Notice: Subject to any disclaimer, the term of this patent is extended or adjusted under 35 U.S.C. 154(b) by 0 days. days.

(21) Appl. No.: 15/592,346

(22) Filed: May 11, 2017

(51) Int. Cl.
| | | |
|---|---|---|
| *B65D 81/05* | (2006.01) | |
| *B65D 81/127* | (2006.01) | |
| *B65D 81/02* | (2006.01) | |
| *B60K 15/067* | (2006.01) | |
| *B65D 6/10* | (2006.01) | |
| *B60K 15/03* | (2006.01) | |
| *B60K 15/073* | (2006.01) | |
| *B65D 81/107* | (2006.01) | |

(52) U.S. Cl.
CPC ........ *B65D 81/05* (2013.01); *B60K 15/03006* (2013.01); *B60K 15/067* (2013.01); *B60K 15/073* (2013.01); *B65D 7/22* (2013.01); *B65D 81/027* (2013.01); *B65D 81/127* (2013.01); *B60K 2015/03059* (2013.01); *B60K 2015/03493* (2013.01); *B60K 2015/0675* (2013.01); *B65D 81/107* (2013.01)

(58) Field of Classification Search
CPC ...... B65D 81/027; B65D 81/127; B65D 7/22; B65D 81/05; B65D 81/053; B65D 81/107; B65D 81/1075; B60K 15/03006; B60K 15/0736; B60K 2015/03046; B60K 15/067; B60K 15/063; B60K 2015/0675; B60K 2015/03059; A62C 3/07

USPC ................. 220/562, 4.14, 581, 586, 564
See application file for complete search history.

(56) References Cited

U.S. PATENT DOCUMENTS

| | | | |
|---|---|---|---|
| 1,148,842 A | | 8/1915 | Huff |
| 1,760,457 A | | 5/1930 | Walker |
| 1,779,397 A | * | 10/1930 | Kraft ............ B64D 37/06 206/527 |
| 2,276,963 A | | 3/1942 | Griffin |
| 2,465,173 A | | 3/1949 | Scales et al. |
| 2,622,887 A | | 12/1952 | Prior |
| 3,158,383 A | * | 11/1964 | Anderson ......... B60P 3/2225 105/360 |
| 3,227,410 A | | 1/1966 | McCuen |

(Continued)

FOREIGN PATENT DOCUMENTS

| | | |
|---|---|---|
| CA | 2553752 A1 | 7/2005 |
| DE | 3722034 A1 | 9/1988 |

(Continued)

*Primary Examiner* — Andrew T Kirsch
*Assistant Examiner* — Jennifer Castriotta

(57) ABSTRACT

A fuel tank in a vehicle. The fuel tank includes a protective outer shell, an inner shell and a crush sleeve. The protective outer shell defines an outer tank. The inner shell defines an inner tank which holds fuel. The inner shell is housed in the outer shell and is isolated from the outer shell by a space. The crush sleeve is provided in the space between the outer shell and the inner shell. The crush sleeve supports the inner shell and maintains the inner shell in position relative to the outer shell. Wherein during an impact to the vehicle, the force of the impact causes the outer shell and the crush sleeve to deform and the inner shell to move relative to the outer shell.

30 Claims, 5 Drawing Sheets

(56) References Cited

U.S. PATENT DOCUMENTS

| | | | |
|---|---|---|---|
| 3,511,515 A | 5/1970 | Cline et al. | |
| 3,552,596 A | 1/1971 | Landon | |
| 3,969,563 A * | 7/1976 | Hollis, Sr. | B32B 3/28 220/62.11 |
| 4,371,181 A | 2/1983 | Monigold et al. | |
| 4,444,373 A | 4/1984 | Hayashi | |
| 4,506,756 A | 3/1985 | Bergous | |
| 4,610,453 A | 9/1986 | Collier | |
| 4,621,822 A | 11/1986 | Knochelmann et al. | |
| 4,723,810 A | 2/1988 | Kanemaru et al. | |
| 4,919,226 A | 4/1990 | Rana et al. | |
| 5,380,042 A | 1/1995 | Hively et al. | |
| 5,443,578 A | 8/1995 | Davis, Jr. | |
| 5,496,069 A | 3/1996 | Milligan | |
| 5,547,224 A | 8/1996 | Kami et al. | |
| 5,556,133 A | 9/1996 | Oku et al. | |
| 5,673,939 A | 10/1997 | Bees et al. | |
| 5,673,940 A | 10/1997 | Gaisford et al. | |
| 5,762,145 A | 6/1998 | Bennett | |
| 6,059,252 A | 5/2000 | Emmann et al. | |
| 6,099,042 A | 8/2000 | Cook et al. | |
| 6,109,290 A | 8/2000 | Sabatinelli | |
| 6,692,028 B2 | 2/2004 | Koster | |
| 6,905,164 B2 | 6/2005 | Marrs et al. | |
| 7,264,277 B2 | 9/2007 | Ono et al. | |
| 7,631,901 B2 | 12/2009 | Diehl | |
| 7,641,254 B2 | 1/2010 | Stegawski et al. | |
| 7,819,431 B2 | 10/2010 | Minami | |
| 7,913,788 B1 | 3/2011 | Bryer et al. | |
| 8,276,698 B2 | 10/2012 | Guss et al. | |
| 8,579,331 B2 | 11/2013 | Hayashi et al. | |
| 9,216,647 B2 | 12/2015 | Shipp | |
| 9,321,346 B2 | 4/2016 | Shipp | |
| 2005/0046169 A1 | 3/2005 | Pfohl et al. | |
| 2006/0032532 A1 * | 2/2006 | Suess | B60K 15/03006 137/266 |
| 2006/0061081 A1 | 3/2006 | Kresse, Jr. et al. | |
| 2006/0214416 A1 | 9/2006 | Watanabe et al. | |
| 2008/0017430 A1 | 1/2008 | Marsala et al. | |
| 2010/0213741 A1 | 8/2010 | Suzuki et al. | |
| 2010/0276165 A1 | 11/2010 | Hobson et al. | |
| 2013/0043702 A1 | 2/2013 | Hettinger et al. | |
| 2013/0264347 A1 | 10/2013 | Fujita | |
| 2016/0039281 A1 | 2/2016 | Shipp et al. | |
| 2016/0068065 A1 | 3/2016 | Shipp | |

FOREIGN PATENT DOCUMENTS

| | | |
|---|---|---|
| DE | 4018197 A1 | 12/1991 |
| DE | 19820338 A1 | 11/1999 |
| DE | 102009039469 A1 | 3/2011 |
| DE | 102011100395 A1 | 1/2012 |
| DE | 202012103321 U1 | 11/2012 |
| DE | 102011117331 A1 | 5/2013 |
| DE | 102012023154 A1 | 8/2013 |
| EP | 0066963 A2 | 12/1982 |
| EP | 0067576 A1 | 12/1982 |
| EP | 1510393 A1 | 3/2005 |
| EP | 1564058 A1 | 8/2005 |
| FR | 1476592 A | 4/1967 |
| FR | 2785576 A1 | 5/2000 |
| FR | 2957888 A1 | 9/2011 |
| GB | 2120987 A1 | 12/1983 |
| JP | 2005-225414 A | 8/2005 |
| JP | 2006273147 A | 10/2006 |
| JP | 2008092451 A | 4/2008 |
| WO | 2011030400 A1 | 3/2011 |
| WO | 2011/052661 A1 | 5/2011 |

* cited by examiner

VEHICLE FUEL TANK FOR IMPROVED CRASHWORTHINESS

FIELD OF THE INVENTION

The present invention is directed to a fuel tank for motor vehicles, including, but not limited to, cars, busses and heavy duty trucks. More particularly, the invention is directed to a fuel tank in which an inner shell is moved axially and/or radially by the energy of an impact to a position in which the inner shell is out of the path of the impact or protected by the an outer shell and a crush sleeve of the fuel shell.

BACKGROUND OF THE INVENTION

It is generally known that in configuring a motor vehicle with a fuel tank, it is important to prevent the fuel tank from damage and spillage during the crash. There are several strategies that have been employed in automotive design to meet those desires and requirements.

Those strategies include, but are not limited to, placing the fuel tank away from the perimeter of the vehicle, ensuring crush space is provided to absorb crash energy before the fuel tank is affected, constructing the fuel tank of materials that are not easily cut or torn, applying shields in areas of the fuel tank that may be vulnerable, routing all supply lines in protected areas and providing the filler with a check valve to prevent leakage. In addition, many fuel tanks are positioned in large cages or structures which are designed to absorb the impact of a crash or event. Other than attempting to absorb the impact, known systems do not use the energy of the impact to move the fuel tank axially and/or radially to a position in which the fuel tank is moved further from the point of impact, out of the path of the impact or protected by the chassis of the vehicle.

Automobiles and light trucks must pass standards for fuel tank leakage in all mandated crash tests that range from frontal impacts to side impacts to rear impacts. However, these standards do not require that the fuel tanks be moveable away from the frame of the vehicle during a collision or other such event. In addition, heavy trucks other than school buses have no federal requirements for crash testing to show a minimum level of crashworthiness of the fuel system.

Currently, most manufacturers of heavy trucks mount thin wall aluminum or steel tanks to the outside of the frame rails for carrying fuel. Due to the location and construction of the fuel tanks in heavy trucks, the tank is exposed to crushing during various crash events, resulting in an increased possibility of fuel spillage, fire and explosion. These risks are a known hazard in fuel storage areas of vehicles and are considered significant if there is an accident causing an object, such as, but not limited to, debris from an accident or guide rail, to penetrate the fuel tank.

Rupturing of fuel tanks is believed to be a common reason for fires or explosions. Conventional fuel tanks sometimes rupture with resulting fires and explosions from the atomization of the fuel from their fuel tanks. Some of these ruptures are caused by punctures of the tank from direct contact with sharp objects during or after the collision. Even if no puncture occurs, the impacts to fuel tanks and impacts transmitted to the fuel tanks from accidents may cause failure of the seams or parent material of conventional fuel tanks resulting in a rupture and a fuel leak.

It would be desirable to provide a vehicle fuel tank which overcomes the problems stated above. It would also be desirable to provide a fuel tank which manages the energy generated by impact, thereby improving crashworthiness and reducing the occurrence of tank failure, fuel spillage, fire and/or explosion.

SUMMARY OF THE INVENTION

An object is to provide a fuel tank with an outer shell and a crush sleeve which protect an inner tank or inner shell during an impact.

An object is to provide a fuel tank which improves crashworthiness and reduces the occurrence of tank failure.

An object is to provide a fuel tank which reduces or prevents fuel spillage, fire and/or explosion.

An embodiment is directed to a fuel tank for use in a vehicle. The fuel tank includes a protective outer shell, an inner shell and a crush sleeve. The inner shell holds fuel. The inner shell is housed in the outer shell and is isolated from the outer shell by a space. The crush sleeve is provided in the space between the outer shell and the inner shell. The crush sleeve supports the inner shell and maintains the inner shell in position relative to the outer shell. Wherein during an impact to the vehicle, the force of the impact causes the outer shell and the crush sleeve to deform and the inner shell to move relative to the outer shell. The inner shell may also deform.

An embodiment is directed to a fuel tank in a vehicle. The fuel tank includes a deformable protective outer shell, a deformable inner shell and a deformable crush sleeve. The deformable protective outer shell defines an outer tank. The inner shell defines an inner tank which holds fuel. The inner shell is housed in the outer shell and is isolated from the outer shell by a space. The deformable crush sleeve is provided in the space between the outer shell and the inner shell. The crush sleeve supports the inner shell and maintains the inner shell in position relative to the outer shell during normal usage. Wherein the deformable protective outer shell and the deformable crush sleeve manage the energy created by an impact to manipulate or move the inner shell to a position in which the inner shell is less prone to failure, reducing the occurrence of a failure of the inner shell.

An embodiment is directed to a fuel tank in a vehicle. The fuel tank includes a protective outer shell, an inner shell and a crush sleeve. The protective outer shell defines an outer tank. The inner shell defines an inner tank which holds fuel. The inner shell is housed in the outer shell and is isolated from the outer shell by a space. The crush sleeve is provided in the space between the outer shell and the inner shell. The crush sleeve supports the inner shell and maintains the inner shell in position relative to the outer shell. The inner shell is movably positioned on the crush sleeve to allow the inner shell to move relative to the outer shell when the vehicle is exposed to an impact. Wherein during an impact to the vehicle, the force of the impact causes the outer shell and the crush sleeve to deform, causing the inner shell to be moved axially and/or radially relative to the outer shell, the crush sleeve or a chassis of the vehicle to a position in which the inner shell is moved further from the point of impact, out of the path of the impact or protected by the chassis of the vehicle.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
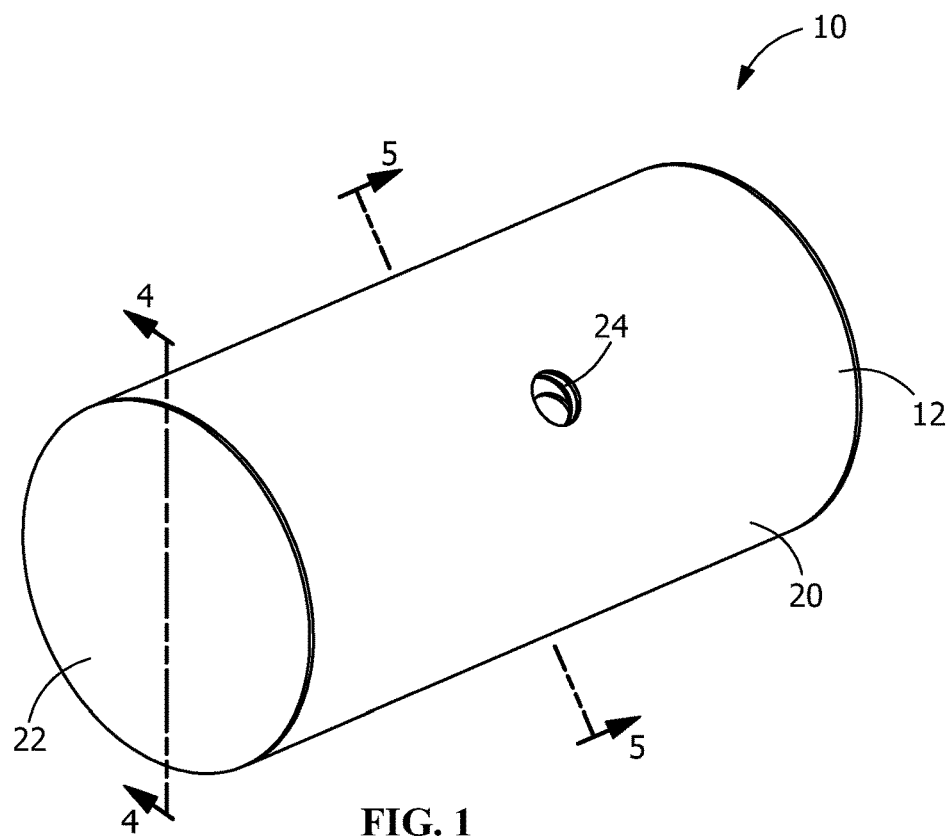
FIG. 1 is a perspective view of an illustrative fuel tank according to the present invention.
Figure 2:
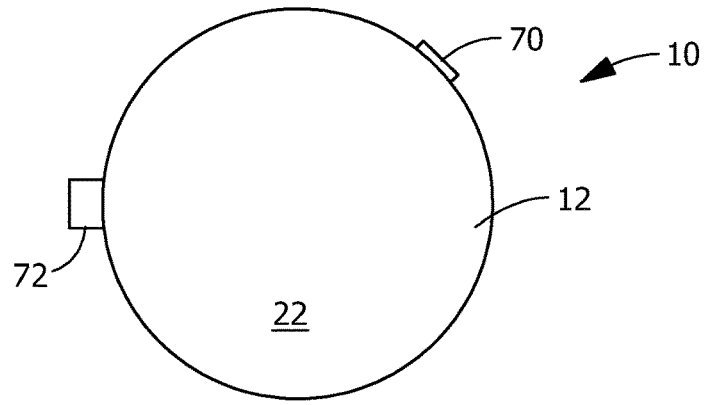
FIG. 2 is an end view of the fuel tank of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Referring now to the drawings wherein like reference characters refer to like and corresponding parts throughout the several views, there is shown in FIGS. 1 through 6 a fuel tank 10 for a motor vehicle 11 (FIGS. 6a and 6b), such as, but not limited to, a car, bus, tractor of a tractor trailer truck, other heavy trucks, boats, airplanes or other types of vehicles. While one fuel tank 10 is shown, other numbers of fuel tanks may be used without departing from the scope of the invention.

Figure 3:
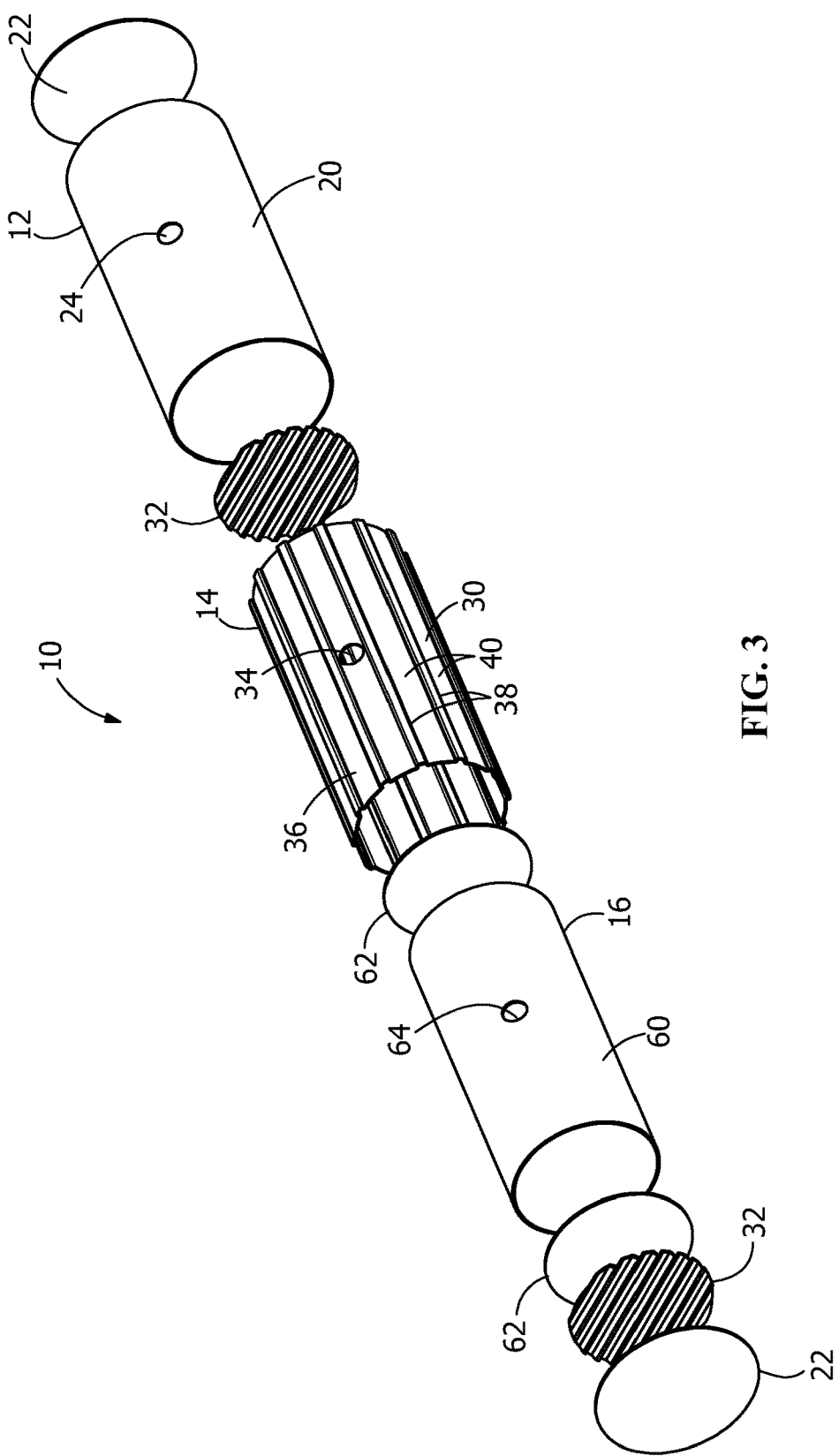
FIG. 3 is an exploded perspective view of the fuel tank of FIG. 1, illustrating an outer shell, a crush sleeve and an inner shell.
Figure 4:
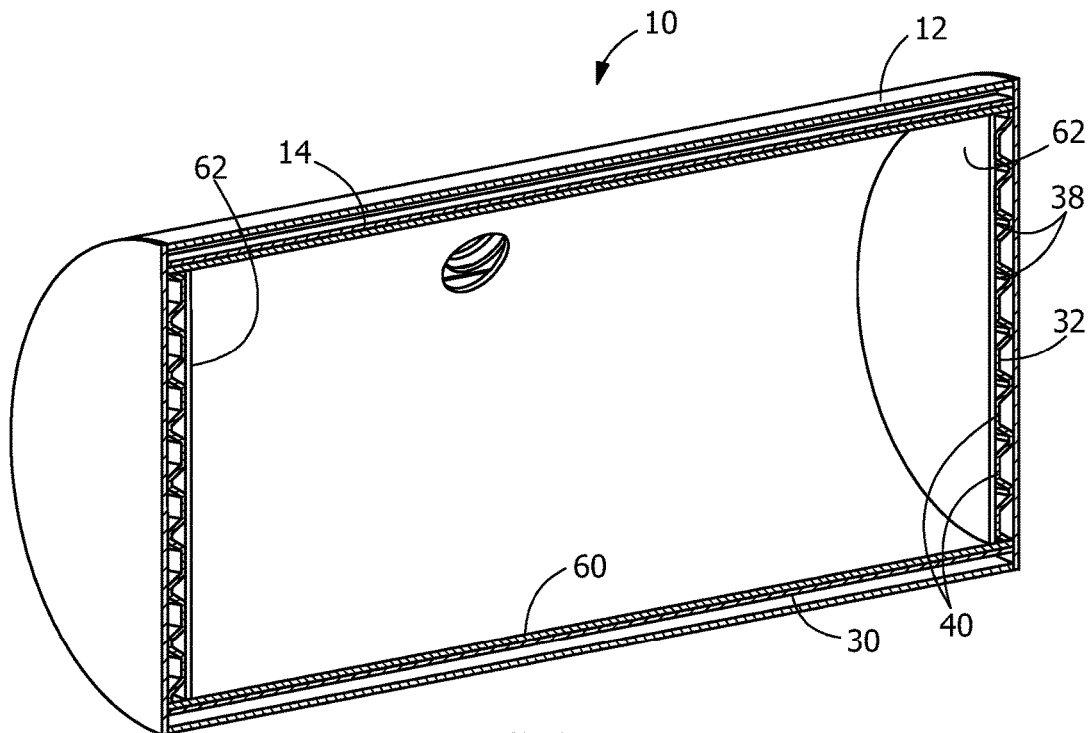
FIG. 4 is a cross-sectional view taken along line 4-4 of FIG. 1.
Figure 5:
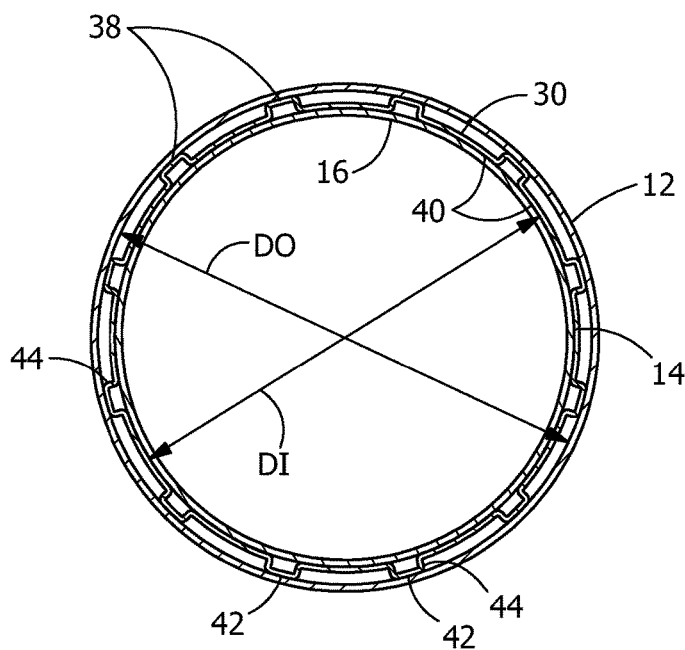
FIG. 5 is a cross-sectional view taken along line 5-5 of FIG. 1.
Figure 6A:
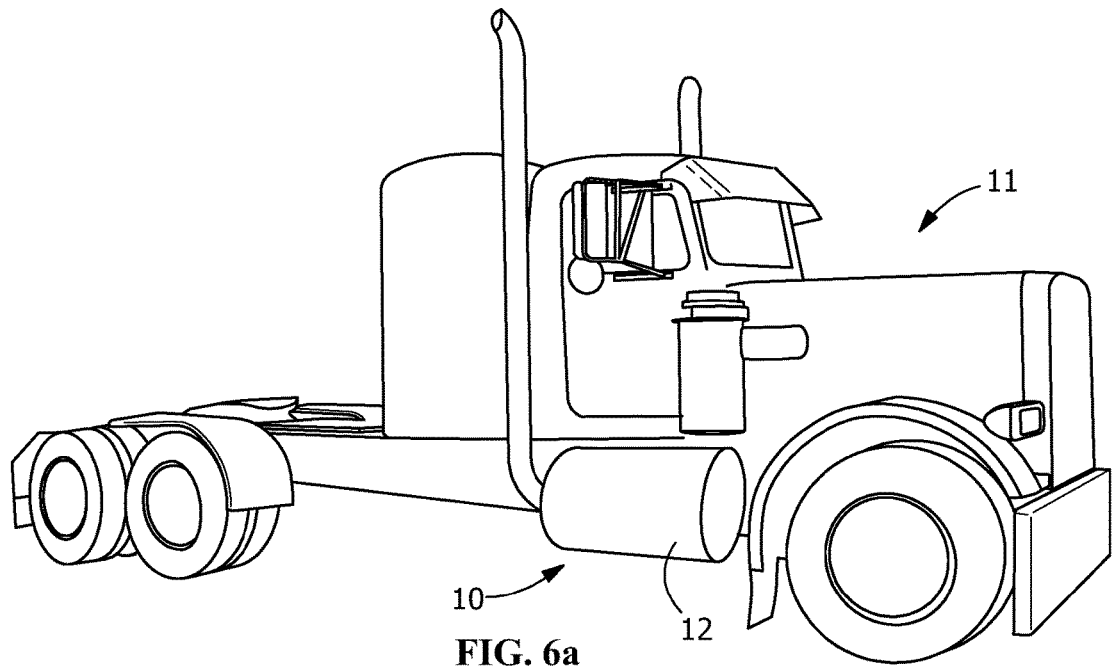
FIG. 6a is a side view of an illustrative vehicle with the fuel tank of FIG. 1 mounted thereto.
Figure 6B:
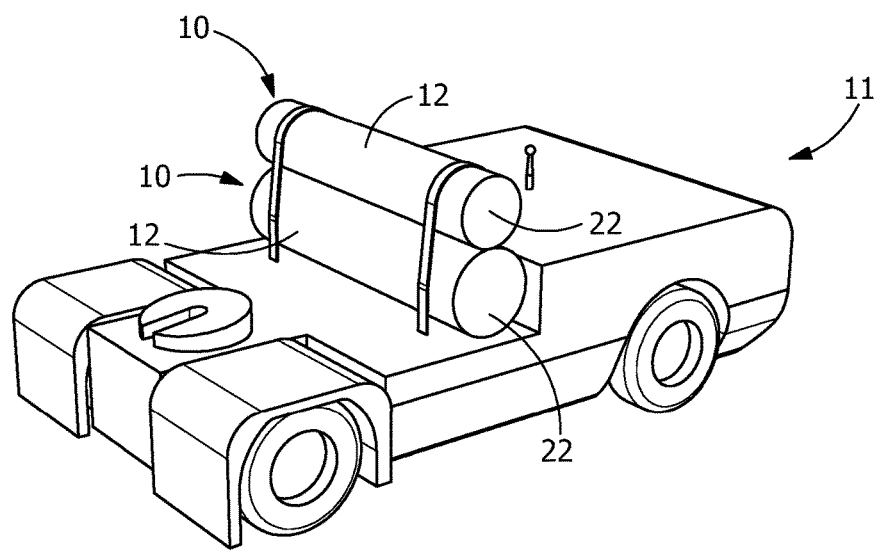
FIG. 6b is a side view of an illustrative autonomous vehicle with the fuel tank of FIG. 1 mounted thereto.
Figure 7:
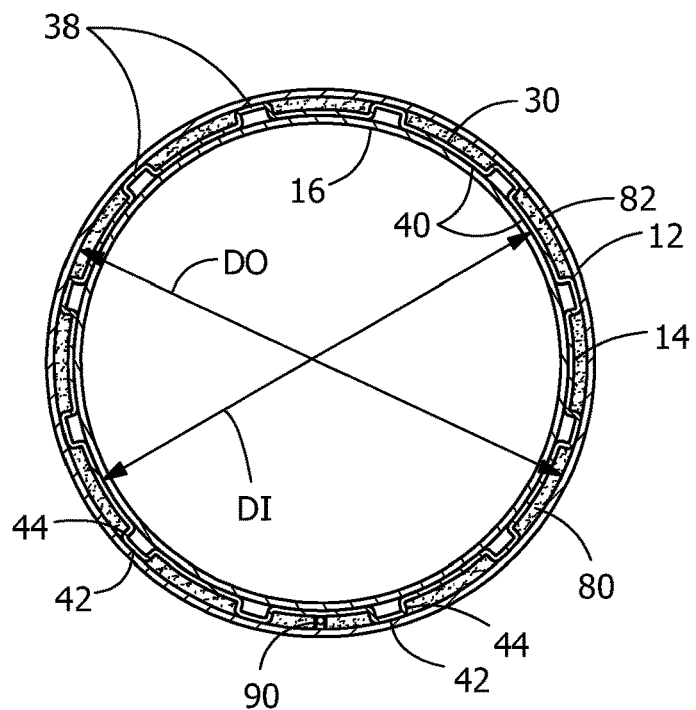
FIG. 7 is a cross-sectional view similar to that of FIG. 5, with a hazard control material provided between the inner shell and the outer shell.

As best shown in FIGS. 3 through 5, the fuel tank 10 includes a protective outer casing, shell or tank 12, a crush sleeve 14 and an inner casing, shell or tank 16 which is configured to hold the fuel. While the protective outer shell 12, the crush sleeve 14 and the inner shell 16 are shown as cylindrical members in the illustrative embodiment, other shapes and configurations may be used without departing from the scope of the invention.

The protective outer shell 12 has a cylindrical side wall 20 and end walls or caps 22. One or both end walls 22 are attached to the side wall 20 after the crush sleeve 14 and inner shell 16 have been inserted therein. In the illustrative embodiment shown, a fuel receiving opening 24 and a fuel dispensing opening (not shown) extends through the side wall 20. The side wall 20 may be made in one continuous piece with no seam or may be made by forming sheet material into a cylindrical member and joining the ends in any conventional manner, such as by a series of continuous welds. The end walls 22 are joined to the side wall 20 in any conventional manner, such as by a series of continuous welds which fasten. The side wall 20 and end walls 22 may be made from any material having the strength characteristics desired, including, but not limited to, aluminum, steel and cross-linked polyethylene. The side wall 20 and end walls 22 of the protective outer shell 12 form an outer tank.

In the illustrative embodiment shown, the crush sleeve 14 has a cylindrical side wall 30 and end caps 32. However, the crush sleeve 14 can be of various configurations without departing from the scope of the invention. For example, spokes, fins or honeycombs may be provided to properly position and maintain the inner shell 16 in the outer shell 12.

In the illustrative embodiment shown, a fuel receiving opening 34 and a fuel dispensing opening (not shown) extends through the side wall 30. The side wall 30 may be made in one continuous piece with no seam or may be made by forming sheet material into a cylindrical member and joining the ends of the sheet in any conventional manner, such as by a series of continuous welds. The side wall 30 may be made from any material having the strength characteristics desired, including, but not limited to, steel, cross-linked polyethylene and carbon fiber reinforced composite.

In the illustrative embodiment shown, the crush sleeve 14 has a corrugated surface 36 which extends essentially the entire length of the crush sleeve 14. The corrugated surface 36 include a plurality of elongate ridge structures or corrugations 38 formed in the material of the crush sleeve 14. Corrugated surface 36 advantageously change the strength and rigidity of the crush sleeve 14. The change in strength or rigidity may be increased or decreased depending upon the structure of the corrugated surface 36. Furthermore, corrugated surface 36 provides spacing between the outer shell 12 and the inner shell 16, as will be more fully described.

The plurality of corrugations 38 may be elongated ridges, or raised portions, of the crush sleeve 14. Thus, each respective elongate ridge structure or corrugation 38 defines a major longitudinal axis and extends longitudinally across the crush sleeve 14. Further, each respective elongate ridge or corrugation 38 of the plurality is spaced apart from adjacent elongate ridges of the plurality at predetermined intervals to form the corrugated surface 36. Thus, a plurality of regions 40 (e.g., valley or troughs) are defined between the respective elongate ridge corrugations 38. It should be noted that a corrugation 38 need not extend across the entire length of crush sleeve 14 and the corrugations 38 are not limited to the exemplary configuration and orientation shown.

The raised corrugations 38 may be of a generally periodic pattern, meaning that they repeat at regular predetermined intervals. In accordance with various aspects of the present disclosure, specific details and features of the corrugation design and pattern can serve to significantly enhance functionality of the crush sleeve 14 and improve performance of the crush sleeve 14 under impact or event, such as, but not limited to, a collision, crash or accident.

As best shown in FIGS. 4 and 5, each elongated ridge or corrugation 38 has a top wall 42 and a pair of two side walls 44. In some example embodiments, the side walls 44 may be oriented at an angle in relation to the top wall 42. In other examples, the side walls 44 may be perpendicular with respect to the top wall 42. The width and height of the top wall 42 and side walls 44 may vary according to the particular strength characteristics desired.

For example, the width and height of the top wall 42 and side wall 44 may be increased or reduced to change or tune the amount of energy absorbed during impact. The corrugated surface designs in accordance with certain aspects of the present teachings may reduce the propensity for local cracks or failure under concentrated impact load. In various aspects, the present disclosure contemplates superior corrugation profiles and designs by optimizing relationships between elongated ridge/corrugation width, corrugation height, material thickness, spacing between elongated ridges/corrugations, wall angles, and the like. For example, the thickness may be increased strategically at various locations on the corrugation to help provide structural support to areas subjected to especially high stress, where mechanical failure may otherwise occur.

The nonlinear configuration of the crush sleeve 14 provides additional strengthening thereby enhancing the ability of the crush sleeve 14 to provide additional integrity to the fuel tank 10 and to provide additional crush resistance for the inner shell 16. The nonlinear configuration also allows for forces applied thereto to be better dissipated over the entire surface of the crush sleeve 14, thereby preventing lateral forces from being transferred directly to the inner shell 16 during an impact. During a less severe impact, the energy distributed to the corrugations 38 of the regions 40 or the impact energy is dissipated or stored elastically, thus reducing the probability of failure during a less severe impact.

The width, the height and the periodic shape of the corrugations 38 may be determined using computer modeling such as computer-aided engineering simulations and experiments. The programs may assist with optimizing geometrical parameters for the corrugation geometry by balancing the height, widths and thickness of the support structure in consideration of the material properties. The programs may assist with optimizing the height, width at the top, wall angle, curvature of the impact surface, and an increase in thickness in localized areas to create a desired balance between the stiffness and impact performance of the corrugated region 40.

In various embodiments, the corrugations 38 may further include strategically thickened areas or thickened regions for structural support, which improve impact resistance. The thickened regions may be included in the top wall 42, side walls 44, the corners where the top wall 42 is joined to the side walls 44, or any combination thereof. Other strengthening features, such as, but not limited to, bevels may also be provided.

In various embodiments, the top wall 42 of each corrugation 38 may be arced or curved. The curvature on the top wall 42, allowing the center area to be the first region to contact the inner shell 16 in the event of an impact, thus storing energy before the corner area contact the inner shell 16, allowing the radius of curvature to deflect the impact and distribute the load across more than one point on the top wall 42. Additionally, the corners may be rounded.

The inner shell 16 has a cylindrical side wall 60 and end walls or caps 62. In the illustrative embodiment shown, a fuel receiving opening 64 and a fuel dispensing opening (not shown) extends through the side wall 60. The side wall 60 may be made in one continuous piece with no seam or may be made by forming sheet material into a cylindrical member and joining the ends in any conventional manner, such as by a series of continuous welds. The end walls 62 are joined to the side wall 60 in any conventional manner, such as by a series of continuous welds which fasten. The side wall 60 and end walls 62 may be made from any material which will not degrade or fail when exposed to the fuel (i.e. diesel) which is stored in the inner shell 16, such as, but not limited to, steel, aluminum, polyethylene or neoprene.

The inner shell 16 may be made of rigid, semi-rigid or elastic material. The side wall 60 and end walls 62 of the inner shell 16 form an inner tank. The inner shell 16 has an outer diameter DO which is smaller than the inner diameter DI of the outer shell 12. The inner shell may include baffles or one or more sub compartments, which may be interconnected or isolated from each other. When fully assembled, the inner shell is maintained in position, for example, but not limited to centered, relative to the outer shell 12 and is held in place by the crush sleeve 14.

While the outer shell 12, crush sleeve 14 and inner shell 16 have a cylindrical configuration in the embodiment shown, other configuration may be used without departing from the scope of the invention.

In various embodiments, crush sleeve 14 (including end caps 32), inner shell 16 (including end caps 62) and/or outer shell 12 (including end caps 22) may have a coating or layer provided thereon to allow the crush sleeve 14 to engage or contact the inner shell 16 and/or outer shell 12 during normal use without exposing the inner shell 16 and/or outer shell 12 to excessive wear or degradation. Such coating may include, but is not limited to, polymer, metallic, ceramic or other substances. Alternatively, the crush sleeve 14 (including end caps 32), inner shell 16 (including end caps 62) and/or outer shell 12 (including end caps 22) may be bonded by welding, adhesive or other means to prevent movement and wear during normal use.

An inlet pipe or tube 70 (FIG. 2) is secured to the fuel tank 10 and extends through fuel receiving openings 24, 34, 64. The inlet tube 70 may be secured to the fuel tank 10 in any known manner. The inlet tube 70 is for the purpose of introducing diesel or other desired fuel into the respective tank 10. The inlet tube may be secured to the fuel tank 10 at various locations, including, but not limited to, near the rearward end of the tank 10. A fuel feed tube or pipe 72 extends through the fuel dispensing openings of the fuel tank 10 for the purpose of feeding the fuel to the engine of the vehicle. The feed tube or pipe 72 may be located at various locations, including, but not limited to, near the forward end of the tank 10.

In the illustrative embodiments shown, the tanks 10 are adapted to be horizontally attached to the truck or vehicle so that the plane of the longitudinal axis of the tank 10 is essentially parallel to the plane of the longitudinal axis of the truck or vehicle. It should be understood that the location and orientation of tank 10 may vary based on various factors, including, but not limited to, the space available for the tanks 10 and the desired capacity of the tank 10.

When the vehicle or truck is operating under normal conditions (no impact caused by a collision, crash or accident has occurred), the inner shell 16 is maintained in position, for example, but not limited to centered, in the outer shell 12 as previously described. However, during an impact, such as caused by a collision, crash or accident, the force of the impact may cause the inner shell 16 to move relative to the outer shell 12.

The outer shell 12 of the fuel tank 10 is mounted to the vehicle using known methods, such as, but not limited to, bolts, welding and straps. The positioning of the fuel tank on the vehicle may vary depending on the configuration of the vehicle. Such locations include, but are not limited to, on the side of the vehicle, under the vehicle or on top of the vehicle, or between the frame rails of the vehicle. In various applications, the outer shell 12 may be mounted in such a manner to allow for the release of the outer shell 12 when a force is applied or transmitted to the fuel tank 10 due to an impact. This allows the fuel tank 10 to be moved axially and/or radially relative to the chassis to a position in which the fuel tank is moved further from the point of impact, out of the path of the impact or protected by the chassis of the vehicle.

In operation the outer shell 12 is mounted to the vehicle as described. The inner shell 16 is not attached to the outer shell 12. Instead, in the illustrative embodiment shown, the inner shell 16 rests on the crush sleeve 14. The crush sleeve 14 is also not attached to the outer shell 12. Instead, in the illustrative embodiment shown, the crush sleeve 14 rests on the outer shell 12. The crush sleeve 14 and inner shell 16 are dimensioned such that when assembled, the inner shell 16 engages the crush sleeve 14 to prevent the movement of the inner shell 16 relative to the crush sleeve 14 during normal operation. The crush sleeve 14 and outer shell 12 are dimensioned such that when assembled, the crush sleeve 14 engages the outer shell 12 to prevent the movement of the crush sleeve 14 relative to the outer shell 12 during normal operation.

While the crush sleeve 14 and inner shell 16 are captured by outer shell 12 and prevented from movement relative to the vehicle and the outer shell 12 during normal operation, the crush sleeve 14 and inner shell 16 may move independent of the vehicle and/or the outer shell 12 during an impact or event. This allows a portion of the energy or the forces associated with an impact to be absorbed outer shell 12 and the crush sleeve 14, thereby reducing the energy or force transferred to the inner shell 16.

The inner shell 16 is moveable relative to the vehicle and the outer shell 12 during the impact, thereby allowing the inner shell 16 to move inside the outer shell 12. In addition, in various embodiments, the outer shell 12 is moveable relative to the vehicle during an impact. This allows the inner shell 16 of the fuel tank 10 to be moved axially and/or radially relative to the chassis of the vehicle to a position in which the inner shell 16 is moved further from the point of impact, out of the path of the impact or protected by the chassis of the vehicle and/or the outer shell 12 and the crush sleeve 14. The movement of the inner shell 16 relative to the vehicle and the outer shell 12 and the crush sleeve 14 may be, but is not limited to, i) in a direction which is horizontal or lateral to the direction of the longitudinal axis of the vehicle, ii) in a direction which is vertical or perpendicular to the direction of the longitudinal axis of the vehicle, iii) in a direction which is in line with the longitudinal axis of the vehicle, iv) rotationally about the x axis, v) rotationally about the y axis, vi) rotationally about the z axis, or iv) in a direction which is a combination of any or all of i), ii), iii), iv), v) and/or vi). This allows the inner shell 16 to have 6 degrees of freedom via the movement and distortion of the outer shell 12 and the crush sleeve 14.

As previously described, the outer shell 12 and the crush sleeve 14 absorb a percentage of the energy or forces associated with the impact or event. The outer shell 12 and crush sleeve 14 also provide additional resistance to punctures or tears, as the outer shell 12 and crush sleeve 14 are made from material having sufficient strength to resist or inhibit the puncture or tearing thereof. As the outer shell 12 and crush sleeve 14 form a continuous shield around the inner shell 16, the inner shell is protected. In addition, as the inner shell 16 is movable or displaced relative to the outer shell 12 and the crush sleeve 14 away from the point of impact during an impact, the inner shell 16 is allowed to be moved away from any object or protrusion which extends through the outer shell 12 and crush sleeve 14 at or near the point of impact, thereby preventing or inhibiting sharp objects or protrusions from contacting the inner shell 16. Instead, the protrusions engage the outer shell 12 and the crush sleeve 14. As the inner shell 16 is protected by the outer shell 12 and crush sleeve 14, the risk of failure of the inner shell 16 is reduced.

The fuel tank 10 described herein absorbs and manages the energy created by an impact or event to manipulate or move the inner shell 16 to a position in which the inner shell 16 is less prone to failure during or after the impact or event thereby improving crashworthiness and reducing the occurrence of tank failure, fuel spillage, fire and/or explosion.

In alternate illustrative embodiments, the outer shell 12, crush sleeve 14 and/or inner shell 16 may also have energy dissipating/absorbing material, such as, but not limited to, aluminum, polymer or ferrous material attached thereto. The energy dissipating/absorbing material provides additional protection to the fuel tanks, as the energy dissipating/absorbing material further isolates the forces associated with the impact or event from reaching or damaging the inner shell 16.

In alternate illustrative embodiments, the crush sleeve 14 may be made from non-corrugated materials. For example, the crush sleeve 14 may be made from one or more foam members which provide energy absorption in the event of an impact. The energy absorbing characteristics of foam members serve to dissipate energy transferred during the impact so that inner shell 16 is less likely to be damaged. To provide the energy absorbing characteristics, the foam members may be made of a closed cell foam, such as PU (Polyurethane), Epoxy-Foam and PMI (Polymethacrylimide). However, it should be appreciated that other types of materials, such as an open cell foam or other impact absorbing materials and structures (e.g. honeycomb structures), can be used to make foam members.

In alternate illustrative embodiments, the space 80 between the inner shell 16 and the outer shell 12 may also include a hazard control material 82 in addition to the crush sleeve 14. The fuel tank 10 may be configured to release the hazard control material 82 in response to a hazard condition (for example, an impact) such that the fuel is less hazardous or rendered substantially harmless. The hazard control material 82 may include a fire extinguishant or fire suppressant material. As a result of an impact, which causes the inner shell 16 to fail, the hazard control material 82 interacts with the fuel to control, suppress or extinguish any combustion associated with the release of the fuel and vapors from the inner shell 16. In this way, the probability of creating a fireball in the fuel tank is reduced and the risks associated with operation of the vehicle are decreased.

Figure 8:
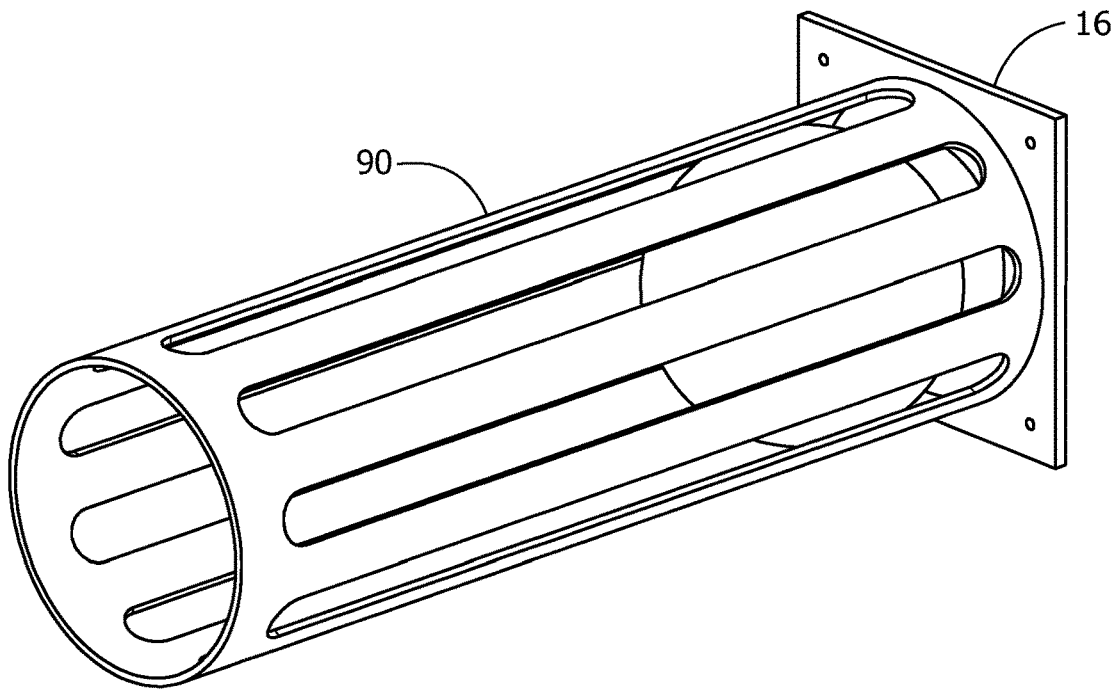
FIG. 8 is a perspective view of a check valve for use with the fuel tank.

The space 80 may be configured to accommodate sufficient hazard control material 82 according to the anticipated hazard. The space 80 may include one or more separate sub compartments, or interconnected semi-separate sub compartments. In addition, the space 80 may comprise any appropriate materials to accommodate the hazard control material 82. For example, the inner shell 16, crush sleeve 14 and outer shell 12 may comprise or be lined with materials that do not react to the hazard control material 82 or provide a shield around the hazard control material 82. The inner shell 16 and/or outer shell 12 may be configured to fail or open in a specific location upon impact to facilitate the controlled release of the fuel and the hazard control material 82 into the surrounding environment, thereby minimizing or preventing the release of atomized fuel. For example, a spring loaded check valve 90 (FIG. 8) may be provided in the inner shell 16. The spring loaded check valve 90 operates in a known manner to maintain the fuel in the inner shell 16 during normal operating conditions. In the event of an impact, the spring loaded check valve 90 is configure to open an release the fuel if a threshold pressure inside the inner shell 16 is exceeded. This facilitates the controlled release of the fuel during an impact. Consequently, the hazard control material 82 may be positioned proximate to the spring loaded check valve 90 for maximum efficiency.

The hazard control material 82 may include a substantially solid material such as granular material or a powder, as well as a substantially fluid material such as liquids, gases and vapors. The hazard control material 82 may comprise a material in various phases simultaneously. In addition, the hazard control material 82 may include multiple materials.

In use, during an impact, the inner shell 16 may rupture or fail, causing the fuel to be released from the inner shell 16, generating the hazard condition. However, the fuel contacts, mixes and reacts with the hazard control material 82, allowing the hazard control material 82 to mitigate the hazard presented by the fuel following the trigger event.

The outer shell 12 and crush sleeve 14 form a protective area, cage or support area which provides a crush zone to protect the inner shell 16 by absorbing and dissipating the energy associated with an impact. The use of the support structure provides both impact and tearing protection for the inner shell 16. The outer shell 12 and crush sleeve 14 also allows mounting of additional energy absorbing devices or structures as needed.

The invention, as shown and described with respect to the illustrative embodiments, provides a revised fuel tank to improve crashworthiness of the vehicle by reducing the occurrence of tank failure, fuel spillage, fire and/or explosion during and after a collision or similar event, while still providing a sufficient range for the vehicle. The fuel tank allows the energy associated with an event to be managed, such as by allowing the inner shell to be pushed or moved axially and/or radially by the energy of the impact of a collision or similar event to a position in which the inner shell is moved further from the point of impact, out of the path of the impact or protected by the chassis of the vehicle.

In various embodiments, the outer shell may be an existing cylindrical saddle fuel tank. In such embodiments, the inner shell and the crush sleeve are dimensioned to be received in the outer shell and operate in the manner described above.

A series of virtual dynamic impact tests ("drop tests") were conducted to simulate a 30 foot drop of the tank onto a rigid surface and the deformation, stress and equivalent plastic strain immediately after the impact of the tank with the ground was measured. The following Table 1 shows the maximum values of each quantity for the following conditions: 1) standard saddle tank from a semi-tractor, empty; 2) standard saddle tank from a semi-tractor, 95% full; 3) fuel tank according the description above, empty; and 4) fuel tank according the description above, 95% full.

TABLE 1

Results Summary of Load Conditions

| Load Condition | | Von Mises Stress (ksi) | | | Equivalent Plastic Strain | | |
|---|---|---|---|---|---|---|---|
| | | Maximum | Allowable | F.S. | Maximum | Allowable | F.S. |
| 1 | Outer Tank | 33.5 | 45 | 1.34 | 0.049 | 0.17 | 3.47 |
| 2 | Outer Tank | 33.6 | 45 | 1.34 | 0.134 | 0.17 | 1.27 |
| 3 | Outer Tank | 34.1 | 45 | 1.32 | 1.154 | 0.17 | 1.10 |
| | Inner Tank | 39.1 | 52.9 | 1.35 | 0.057 | 0.20 | 3.51 |
| 4 | Outer Tank | 31.3 | 45 | 1.44 | 0.133 | 0.17 | 1.28 |
| | Inner Tank | 38.6 | 52.9 | 1.37 | 0.121 | 0.20 | 1.65 |

As is shown in the table, the factor of safety increases for stress and strain when under load conditions 3 and 4 (fuel tank according the description) when compared with load conditions 1 and 2 (known standard saddle tank). Additionally, the factor of safety of the inner shell is greater than that of the outer shell or tank, indicating that the fuel tank according the description is safer against breaches of the tank with higher margins against material failure.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A fuel tank for use in a vehicle, the fuel tank comprising:
   a protective outer shell;
   an inner shell which holds fuel, the inner shell housed in the outer shell, the inner shell being isolated from the outer shell by a space;
   a crush sleeve provided in the space between the outer shell and the inner shell, the crush sleeve supporting the inner shell and maintaining the inner shell in position relative to the outer shell;
   the crush sleeve engages but is not attached to the outer shell, the inner shell engages but is not attached to the crush sleeve;
   a hazard control material provided in the space between the outer shell and the inner shell, the hazard control material is a fire extinguishant or a fire suppressant material;

wherein the crush sleeve and the inner shell are captured by the outer shell and prevented from movement relative to the vehicle and the outer shell prior to an impact to the vehicle;

wherein during an impact to the vehicle, a first portion of energy associated with the impact is absorbed by the outer shell and the crush sleeve, thereby reducing a second portion of the energy transferred to the inner shell.

2. The fuel tank of claim 1, wherein the protective outer shell, the inner shell and the crush sleeve are cylindrical.

3. The fuel tank of claim 1, wherein the inner shell is centered in the outer shell when the fuel tank is not exposed to the impact.

4. The fuel tank of claim 1, wherein the crush sleeve has a corrugated surface which provides energy absorption in the event of the impact.

5. The fuel tank of claim 4, wherein the corrugated surface has raised corrugations which extend in repetitive intervals around the entire corrugated surface.

6. The fuel tank of claim 4, wherein the corrugated surface has nonlinear corrugations.

7. The fuel tank of claim 1, wherein the inner shell, the outer shell or the crush sleeve has a coating provided thereon to allow the crush sleeve to engage the inner shell or the outer shell without causing excessive wear to the inner shell, the outer shell or the crush sleeve.

8. The fuel tank of claim 1, wherein the hazard control material is a granular material or powder material.

9. A fuel tank in a vehicle, the fuel tank comprising:
a deformable protective outer shell defining an outer tank;
a deformable inner shell defining an inner tank which holds fuel, the inner shell housed in the outer shell, the inner shell being isolated from the outer shell by a space;
a deformable crush sleeve provided in the space between the outer shell and the inner shell, the crush sleeve supporting the inner shell and maintaining the inner shell in position relative to the outer shell;
the deformable crush sleeve engages but is not attached to the deformable outer shell, the deformable inner shell engages but is not attached to the deformable crush sleeve;
wherein the deformable crush sleeve and the deformable inner shell are captured by the deformable outer shell and prevented from movement relative to the vehicle and the deformable outer shell prior to an impact to the vehicle;
wherein the deformable protective outer shell and the deformable crush sleeve manage the energy created by the impact, reducing the occurrence of a failure of the deformable inner shell;
wherein during the impact to the vehicle, the inner shell is configured to move i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii), iii), iv), v) and/or vi).

10. The fuel tank of claim 9, wherein the deformable inner shell is centered in the deformable outer shell when the fuel tank is not exposed to the impact.

11. The fuel tank of claim 9, wherein the deformable crush sleeve has a corrugated surface with raised corrugations.

12. The fuel tank of claim 9, wherein the deformable crush sleeve is a foam member which provides energy absorption in the event of the impact.

13. The fuel tank of claim 11, wherein the deformable inner shell, the deformable outer shell or the deformable crush sleeve has a coating provided thereon to allow the deformable crush sleeve to engage the deformable inner shell or the deformable outer shell without causing excessive wear to the deformable inner shell, the deformable outer shell or the deformable crush sleeve.

14. The fuel tank of claim 11, wherein a hazard control material is provided in the space between the deformable outer shell and the deformable inner shell.

15. The fuel tank of claim 14, wherein the hazard control material is a fire extinguishant or a fire suppressant material.

16. The fuel tank of claim 14, wherein the hazard control material is a granular material or powder material.

17. A fuel tank for use in a vehicle, the fuel tank comprising:
a protective outer shell having an outer shell side wall and outer shell end walls which define an inner shell receiving area;
an inner shell which holds fuel, the inner shell housed in the inner shell receiving area of the outer shell, the inner shell having an inner shell side wall which is proximate to and spaced from the outer shell side wall, the inner shell having inner shell end walls which are proximate to and spaced from the outer shell end walls, the inner shell cooperates with the outer shell to maintain the position of the inner shell relative to the outer shell and relative to the vehicle during normal operation;
wherein during an impact to the vehicle, the inner shell is configured to move independent of the outer shell and the vehicle allowing a portion of energy or forces associated with the impact to be absorbed by the outer shell, reducing the energy or the forces transferred to the inner shell;
wherein during the impact to the vehicle, the inner shell is configured to move i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii iii), iv), v) and/or vi).

18. A fuel tank for use in a vehicle, the fuel tank comprising:
a protective outer shell;
an inner shell which holds fuel, the inner shell housed in the outer shell, the inner shell being isolated from the outer shell by a space;
wherein the inner shell is prevented from movement relative to the vehicle and the outer shell prior to an impact to the vehicle;
wherein during an impact to the vehicle, the force of the impact causes the inner shell to move independent of the vehicle and the outer shell, allowing a first portion of energy associated with the impact to be absorbed by the outer shell, reducing a second portion of the energy transferred to the inner shell;

wherein during the impact to the vehicle, the inner shell is configured to move i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii iii), iv), v) and/or vi).

19. The fuel tank of claim 18, wherein the protective outer shell and the inner shell are cylindrical.

20. The fuel tank of claim 18, wherein the inner shell is centered in the outer shell when the fuel tank is not exposed to the impact.

21. The fuel tank of claim 18, wherein a crush sleeve is provided in the space between the outer shell and the inner shell, the crush sleeve supporting the inner shell and maintaining the inner shell in position relative to the outer shell.

22. The fuel tank of claim 21, wherein the crush sleeve engages but is not attached to the outer shell, the inner shell engages but is not attached to the crush sleeve.

23. The fuel tank of claim 21, wherein the crush sleeve has a corrugated surface which provides energy absorption in the event of the impact.

24. The fuel tank of claim 23, wherein the corrugated surface has raised corrugations which extend in repetitive intervals around the entire corrugated surface.

25. The fuel tank of claim 23, wherein the corrugated surface has nonlinear corrugations.

26. The fuel tank of claim 21, wherein the crush sleeve is a foam member which provides energy absorption in the event of the impact.

27. The fuel tank of claim 21, wherein the inner shell, the outer shell or the crush sleeve has a coating provided thereon to allow the crush sleeve to engage the inner shell or the outer shell without causing excessive wear to the inner shell, the outer shell or the crush sleeve.

28. The fuel tank of claim 18, wherein a hazard control material is provided in the space between the outer shell and the inner shell.

29. The fuel tank of claim 28, wherein the hazard control material is a fire extinguishant or a fire suppressant material.

30. The fuel tank of claim 28, wherein the hazard control material is a granular material or powder material.

* * * * *